United States Patent
Posch et al.

(10) Patent No.: US 10,435,085 B2
(45) Date of Patent: Oct. 8, 2019

(54) WIND DEFLECTOR MODULE

(71) Applicant: Dr. Ing. h.c. F. Porsche Aktiengesellschaft, Stuttgart (DE)

(72) Inventors: Tobias Posch, Wimsheim (DE); Sebastian Weber, Esslingen (DE); Riccardo Bauer, Owen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/800,150

(22) Filed: Nov. 1, 2017

(65) Prior Publication Data

US 2018/0118282 A1    May 3, 2018

(30) Foreign Application Priority Data

Nov. 3, 2016  (DE) .......................... 10 2016 120 940

(51) Int. Cl.
*B62D 35/00*  (2006.01)
*B62D 37/02*  (2006.01)

(52) U.S. Cl.
CPC ............ *B62D 35/007* (2013.01); *B62D 35/00* (2013.01); *B62D 37/02* (2013.01); *Y02T 10/82* (2013.01)

(58) Field of Classification Search
CPC .... B62D 35/00; B62D 35/001; B62D 35/002; B62D 35/005; B62D 37/02
USPC ............................. 296/180.1–180.5; 180/901
See application file for complete search history.

(56) References Cited

U.S. PATENT DOCUMENTS

| 2006/0006694 A1* | 1/2006 | Hillgaertner | B62D 35/007 296/180.1 |
| 2012/0017413 A1* | 1/2012 | Carter | B62D 65/06 29/428 |

FOREIGN PATENT DOCUMENTS

DE    102010000634 A1    9/2011

* cited by examiner

*Primary Examiner* — Dennis H Pedder
(74) *Attorney, Agent, or Firm* — Leydig, Voit & Mayer, Ltd.

(57) ABSTRACT

A wind deflector module for a motor vehicle includes an aerodynamic component which is arranged so as to be movable on the outside of the motor vehicle, a drive unit configured to be movable in a Z direction of the motor vehicle and being mechanically connected to the aerodynamic component in order to move the aerodynamic component, and a mounting bracket mechanically connected to the drive unit in order to mount the drive unit. The mounting bracket is mounted on a support frame of the motor vehicle so as to be adjustable with respect to a Y and/or an X direction of the motor vehicle.

5 Claims, 3 Drawing Sheets

WIND DEFLECTOR MODULE

CROSS REFERENCE TO RELATED APPLICATIONS

This application claims benefit to German Patent Application No. DE 10 2016 120 940.6, filed Nov. 3, 2016, which is hereby incorporated by reference herein.

FIELD

The present invention relates to a wind deflector module, in particular a rear spoiler or rear wing for a motor vehicle comprising an aerodynamic component, such as, for example, a spoiler module or wing module which is arranged so as to be movable on the outside of the motor vehicle. The present invention further relates to a motor vehicle having such an aerodynamic component, for example a rear spoiler.

BACKGROUND

In the automotive industry, in particular in the development of sports cars, it is generally known to provide rear spoilers such that they can be adjusted or extended in the X and Z direction by means of a drive. Such a rear spoiler module for a passenger car is known for example from DE 10 2010 000 634 A1. Here, the drive unit is usually secured fixedly to the bodyshell on the chassis of the motor vehicle, it being the case here that no fixed or only limited reference to the outer panel or to the outer skin of the motor vehicle is established. A disadvantage with this installation variant is that dimensional deviations which occur, in particular in the case of different vehicle types, must be compensated for with a high degree of effort, the drive unit of the rear spoiler thus having to be installed with significant fluctuations during final assembly. The resultant dimensional scatter of the assembly position of the rear spoiler would thus lead to considerable rework on the produced vehicle.

SUMMARY

In an embodiment, the present invention provides a wind deflector module for a motor vehicle. The wind deflector module includes an aerodynamic component which is arranged so as to be movable on the outside of the motor vehicle, a drive unit configured to be movable in a Z direction of the motor vehicle and being mechanically connected to the aerodynamic component in order to move the aerodynamic component, and a mounting bracket mechanically connected to the drive unit in order to mount the drive unit. The mounting bracket is mounted on a support frame of the motor vehicle so as to be adjustable with respect to a Y and/or an X direction of the motor vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide wind deflector modules that reduce the assembly effort for readjustment.

Embodiments of the present invention provide wind deflector modules that include a drive unit which is movable in a Z direction and is mechanically connected to an aerodynamic component in order to move the aerodynamic component, and a mounting bracket which is mechanically connected to the drive unit in order to mount the drive unit. Embodiments of the present invention further provide wind deflector modules wherein the mounting bracket is mounted on a support frame of the motor vehicle so as to be adjustable with respect to a Y and/or X direction of the motor vehicle.

By virtue of the fact that the mounting unit is mounted adjustably on a support frame of the motor vehicle, the subsequent adjustment of the wind deflector module is possible with reduced effort, and simultaneously by virtue of the fact that the wind deflector module is mounted on the support frame of the motor vehicle, fluctuations in the outer skin joints have no influence on the position of the aerodynamic component, with the result that the rework quota is further reduced.

In a preferred embodiment of the invention, the mounting bracket is secured to a reference hole in the support frame by means of a bolt. Consequently, the mounting unit can be arranged with respect to the Y and/or X direction on the support frame of the motor vehicle with technically little effort.

In a preferred embodiment, the mounting bracket is formed by a cast mounting bracket. Consequently, the technical mounting effort and at the same time the module weight can be reduced.

In a preferred embodiment, an angle of the mounting bracket in the X direction and/or an angle about a Y axis can be set. Consequently, X-Y positioning is possible with little effort.

In a preferred embodiment of the invention, the reference of the bolt in the reference hole is formed relative to a joint-forming region of the vehicle body structure. Consequently, mechanical positioning in the X and Y direction can be ensured with technically little effort.

In a further preferred embodiment, the wind deflector module has a drive unit at each of two opposite positions. Consequently, reliable and symmetrical movement of the aerodynamic component on the motor vehicle is possible.

In a further preferred embodiment, the mounting bracket has an opening through which the drive unit is guided. Consequently, precise movement of the drive unit in the Z direction is possible.

As mentioned above, the special mounting of the mounting bracket on the support frame of the motor vehicle makes it possible to considerably reduce the rework quota since the aerodynamic component is mechanically mounted separately from the outer skin and is movable or adjustable in the X and/or Y direction. Consequently, readjustment is either not necessary or else possible with technically little effort.

Figure 1:
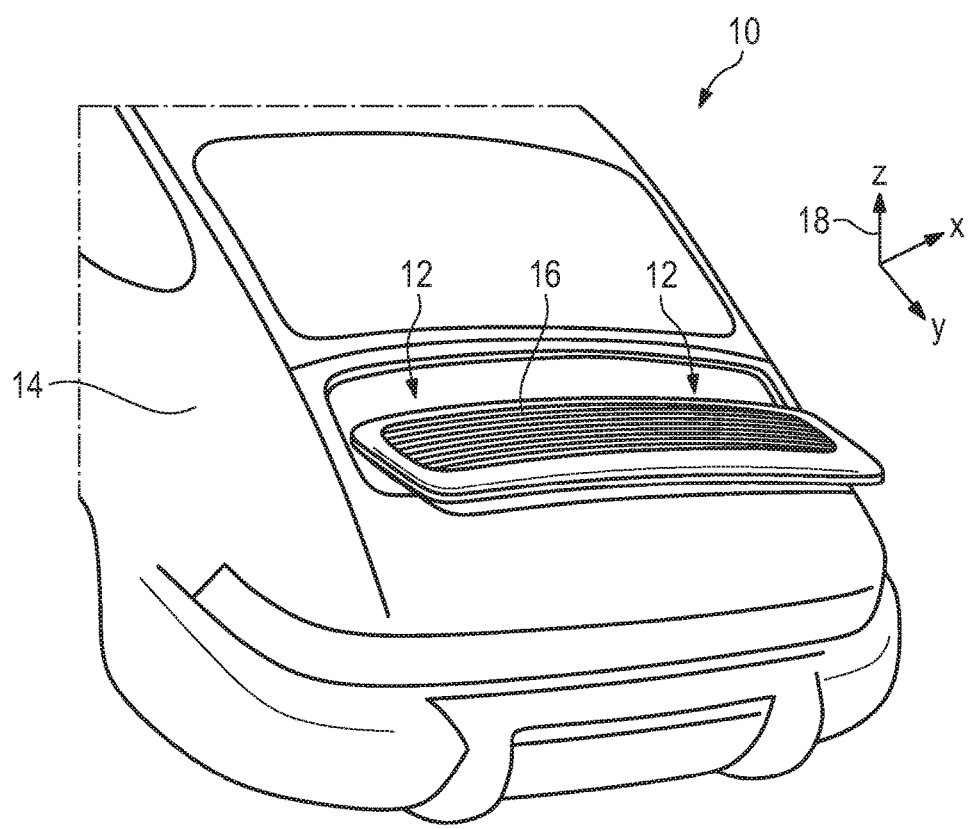
FIG. 1 shows a motor vehicle in a rear view having a wind deflector module.

FIG. 1 shows a rear view of a motor vehicle which is generally designated by 10. The motor vehicle 10 has a support frame 12 to which there is secured an outer skin 14 having a joint-forming region of the vehicle body structure. The vehicle body structure forms a visible outer skin of the motor vehicle 10 that is formed by joint-forming outer panels.

The rear region of the motor vehicle 10 illustrated in FIG. 1 further has a wind deflector module 16 in the form of a rear spoiler for the motor vehicle 10, the wind deflector module 16 being mounted or arranged so as to be movable relative to the motor vehicle in a Z direction 18.

Figure 2:
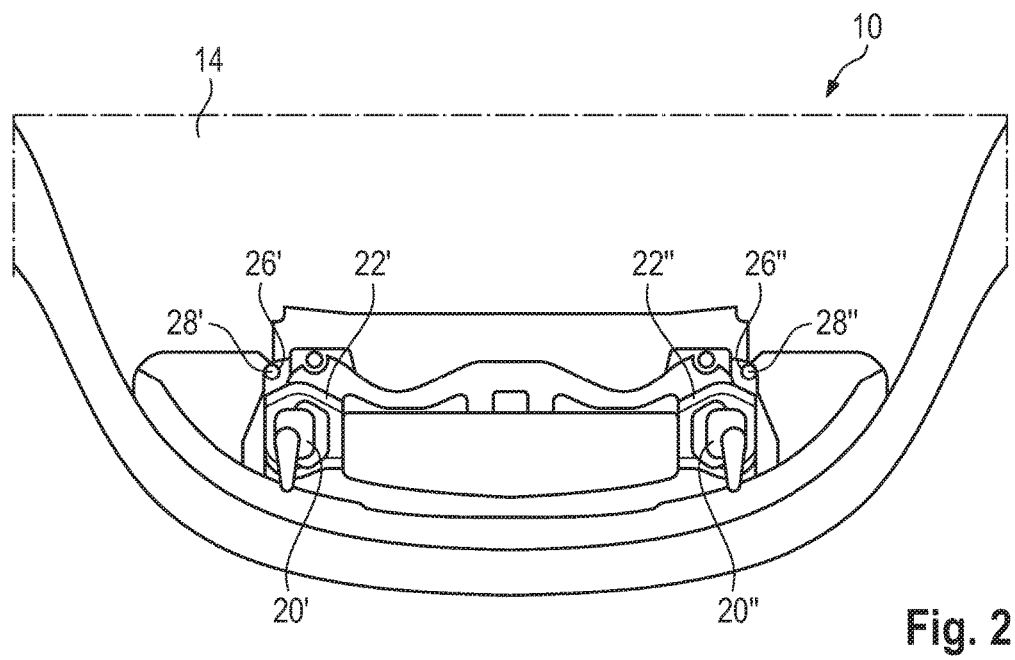
FIG. 2 shows the wind deflector module of FIG. 1 with two drive units in a schematic sectional view.

FIG. 2 shows a schematic sectional plan view of a rear region of the motor vehicle 10 with the wind deflector module 16 and two drive units 20', 20", the drive units 20', 20" being secured to opposite ends of the wind deflector module 16 and each being mechanically connected to or mounted with a mounting bracket 22', 22". The mounting brackets 22', 22" are each mounted on the support frame 12, that is to say on the non-joint-forming region of the motor vehicle body structure, so as to be mechanically movable both in the X and in the Y direction, specifically by means of a referencing hole 26', 26" and a referencing bolt 28', 28" as explained in more detail hereinbelow. As a result, subsequent X-Y positioning can take place.

Figure 3:
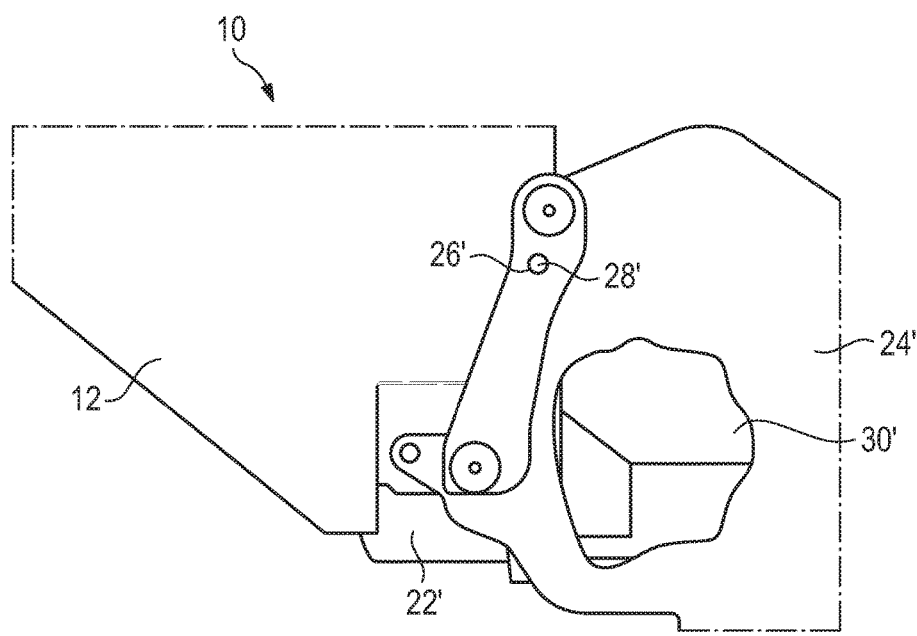
FIG. 3 shows a mounting bracket for mounting the drive unit of the wind deflector module of FIGS. 1 and 2.

FIG. 3 illustrates a detail view of the mounting bracket 22' and a guide module 24' for guiding the drive unit 20'. The mounting bracket 22' is mounted by means of a referencing hole 26', through which a referencing bolt 28' is guided. The referencing bolt 28' in the referencing hole 26' serves for the X-Y positioning of the mounting bracket 22' and the guide module 24' for guiding the drive unit 20'. The drive unit 20' is guided in the Z direction through an opening 30' in the guide module 24', with the result that precise guiding of the wind deflector module 16 in the Z direction is possible and readjustment is not necessary or the effort required for readjustment is considerably reduced.

Readjustment is effected by individual measurement relative to the joint-forming region 14 of the vehicle body. The adjustability of the mounting bracket 22' by means of the referencing bolts 28' in the referencing hole 26' serves for this purpose.

Figure 4:
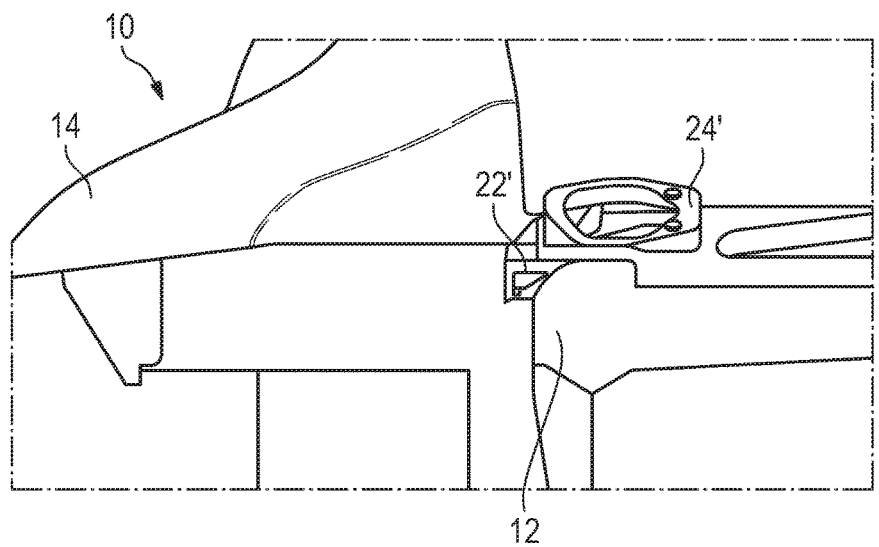
FIG. 4 shows the mounting bracket of FIG. 3 in a schematic rear view.

FIG. 4 illustrates a schematic rear view of the motor vehicle 10 with the mounting bracket 22' and the guide module 24'. The guide module 24' is mounted by means of the referencing bolt 28' on the mounting bracket 22' in the X and Y direction, which mounting bracket is fastened to the support frame 12.

Figure 5:
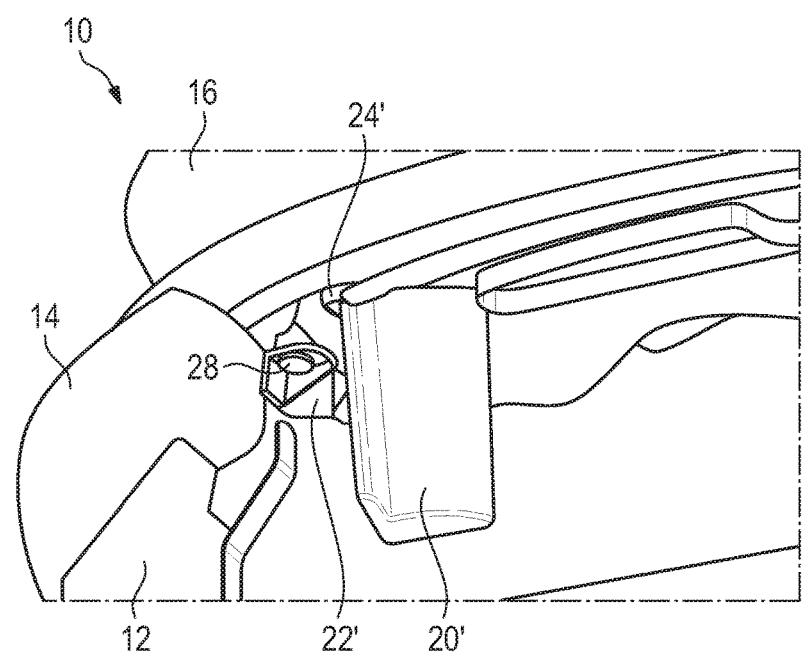
FIG. 5 shows the drive unit of the wind deflector module in an installed state in the mounting bracket.

FIG. 5 substantially shows the drive unit 20' in a schematic rear view of the motor vehicle 10. A housing of the drive unit 20' is secured to the guide module 24', with the result that the drive unit is connected in the Z direction to the wind deflector module 16 through the opening 30'. The guide module 24' is mechanically connected in the X and Y direction to the mounting bracket 22' via the referencing bolt 28, with the result that a referencing mounting on the support frame 12 is possible. The mounting bracket 22' is mounted on the support frame 12 so that it can be set at an angle in the X direction about the axis and/or Y direction in order to allow subsequent positioning of the drive unit 20'.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A wind deflector module for a motor vehicle, comprising:
   an aerodynamic component which is arranged so as to be movable on the outside of the motor vehicle;
   a first drive unit and a second drive unit, each of the first drive unit and the second drive unit being configured to be movable in a Z direction of the motor vehicle and being mechanically connected to the aerodynamic component in order to move the aerodynamic component;
   a first mounting bracket mechanically connected to the first drive unit in order to mount the first drive unit, wherein the first mounting bracket is secured, by a first bolt, to a first reference hole in a support frame of the motor vehicle so as to be adjustable, relative to the outer skin of the motor vehicle, in a Y and an X direction of the motor vehicle; and
   a second mounting bracket mechanically connected to the second drive unit in order to mount the second drive unit; wherein the second mounting bracket is secured, by a second bolt, to a second reference hole in a support frame of the motor vehicle so as to be adjustable, relative to the outer skin of the motor vehicle, in a Y and an X direction of the motor vehicle.

2. The wind deflector module as claimed in claim 1, wherein the mounting bracket is a cast mounting bracket.

3. The wind deflector module as claimed in claim 1, wherein the first drive unit and the second drive unit are at each of two opposite positions of the wind deflector module.

4. The wind deflector module as claimed in claim 1, wherein the first mounting bracket has an opening through which the first drive unit is guided and the second mounting bracket has an opening through which the second drive unit is guided.

5. A motor vehicle having a wind deflector module as claimed in claim 1.

* * * * *